United States Patent [19]

Raidel, Sr.

[11] Patent Number: 4,465,300
[45] Date of Patent: Aug. 14, 1984

[54] VEHICLE SUSPENSION FOR ROUGH TERRAIN

[76] Inventor: John E. Raidel, Sr., Rte. 1, Box 400-M, Springfield, Mo. 65804

[21] Appl. No.: 409,547

[22] Filed: Aug. 19, 1982

[51] Int. Cl.³ .............................................. B60G 9/02
[52] U.S. Cl. .................................. 280/725; 267/22 R
[58] Field of Search ............... 267/8 R, 8 B, 22 R, 267/57, 60; 280/664, 692, 697, 715, 725

[56] References Cited

U.S. PATENT DOCUMENTS

| | | | |
|---|---|---|---|
| 865,259 | 9/1907 | Loeffler | 267/22 R |
| 2,352,446 | 6/1944 | Pointer | 280/725 X |
| 2,746,766 | 5/1956 | Nallinger | 280/725 |
| 2,963,301 | 12/1960 | Rosenkrands | 280/725 |
| 3,201,143 | 8/1965 | Drong | 280/725 X |
| 4,262,929 | 4/1981 | Pierce | 280/725 X |

Primary Examiner—Duane A. Reger
Attorney, Agent, or Firm—Rogers, Eilers & Howell

[57] ABSTRACT

A suspension assembly for a truck type vehicle comprises a trunnion shaft rotatably mounted to the axle with a pair of spring supports mounted to the trunnion shaft, a pair of coil springs extending between the spring supports and the chassis, a pair of torque rods rotatably mounted and extending between a chassis member and the axle seat, and a torsion roll bar pivotally connected to and extending between the suspension on each side of the vehicle and the chassis frame. In an alternate embodiment, a single piece axle seat and spring support assembly is bolted to the axle for mounting of the springs.

19 Claims, 11 Drawing Figures

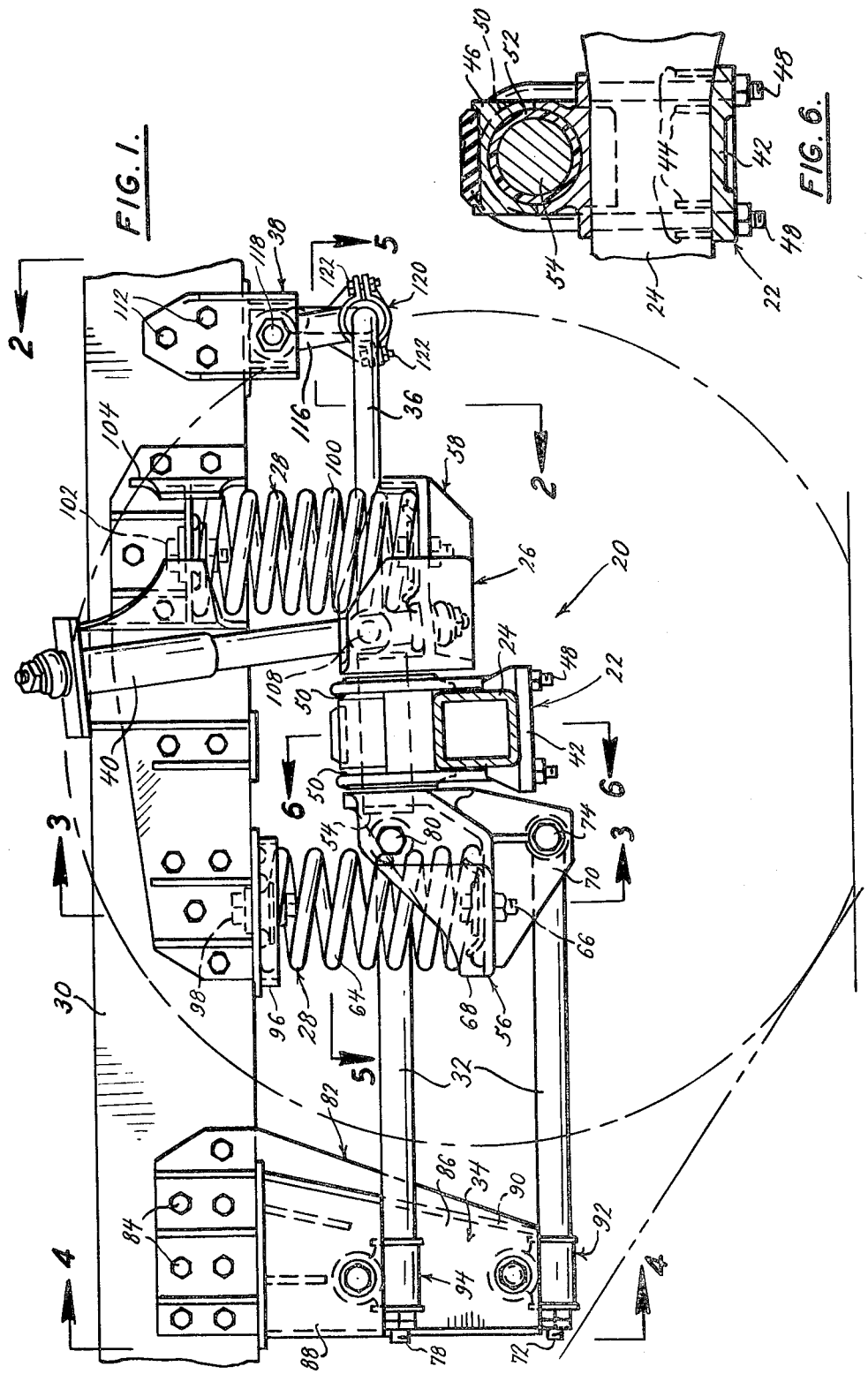

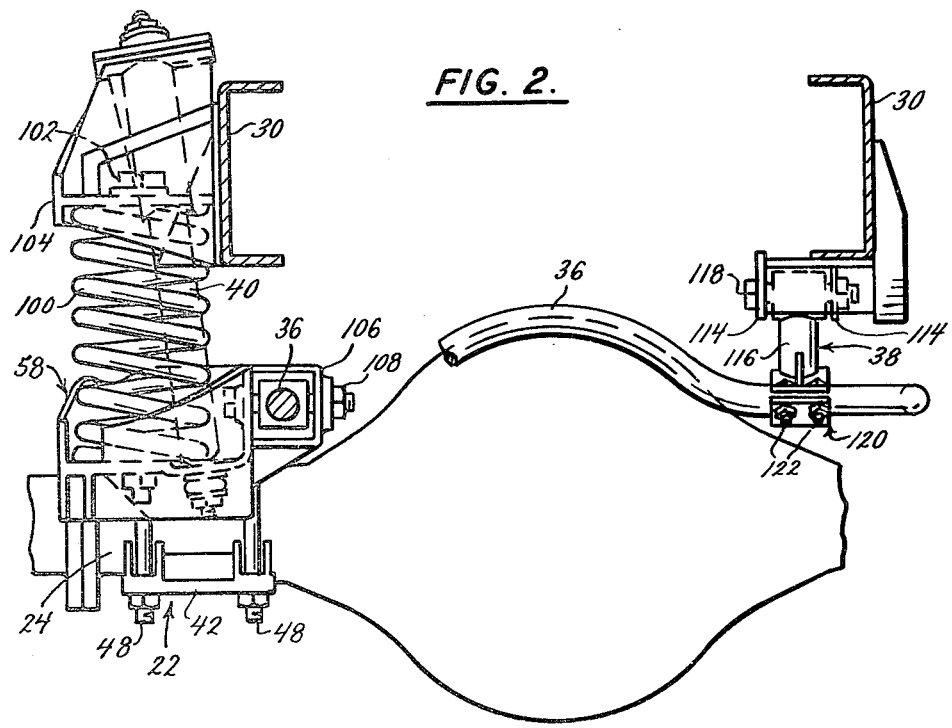
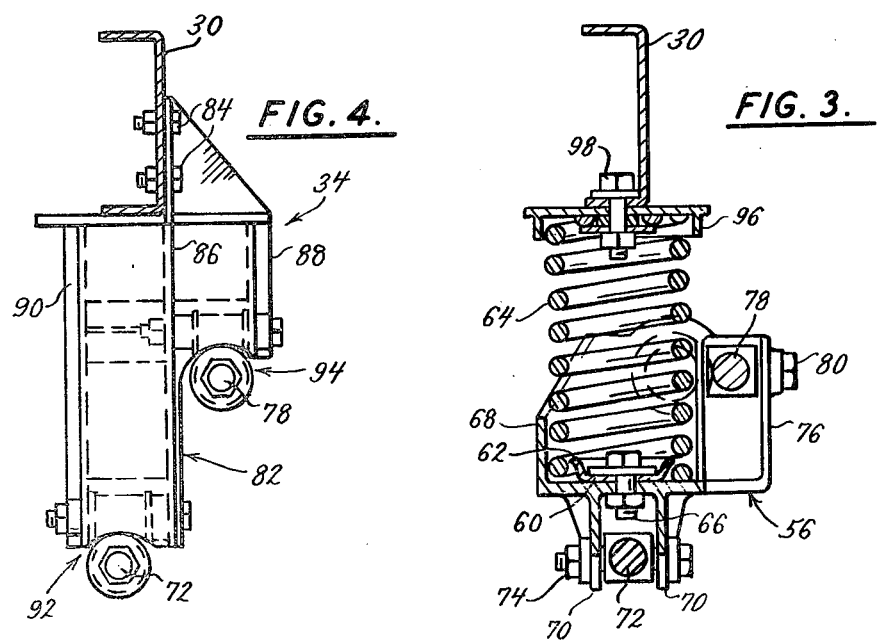

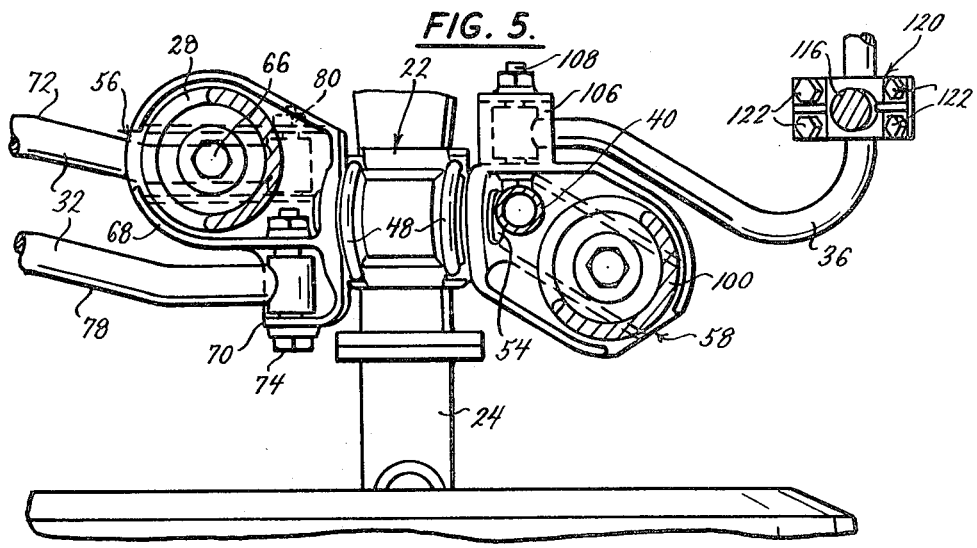
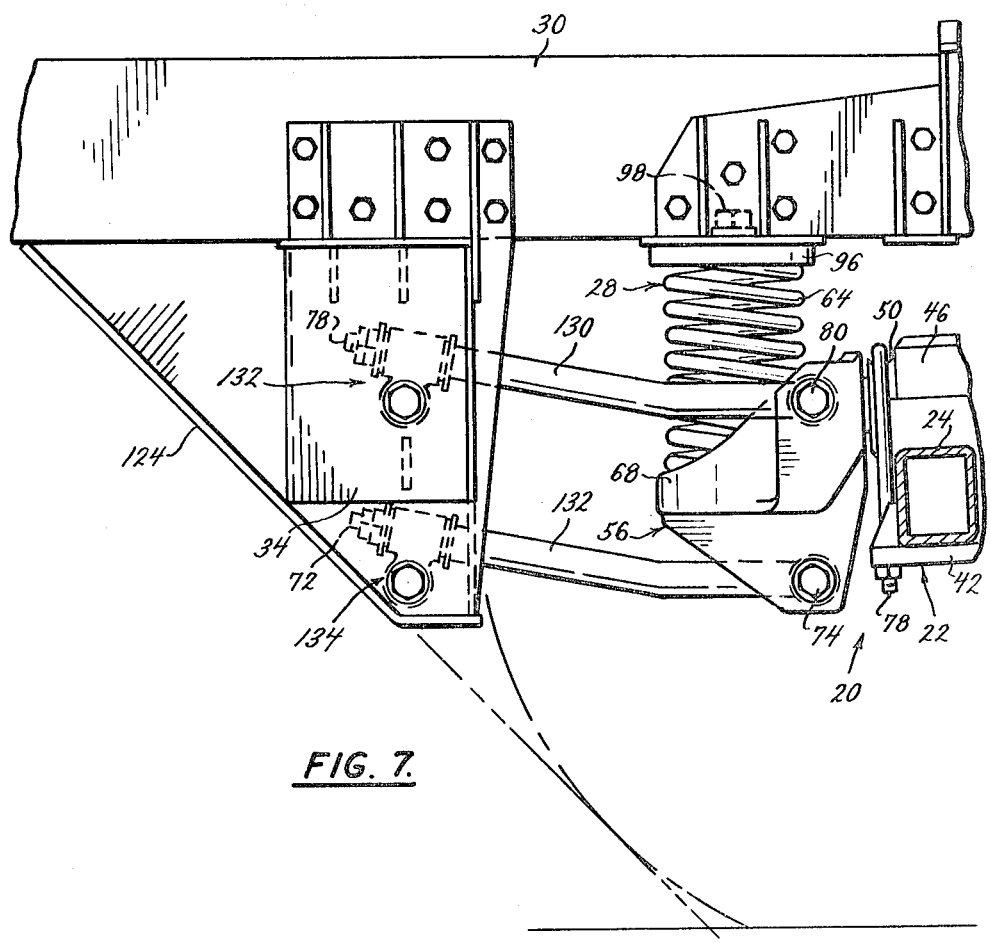

VEHICLE SUSPENSION FOR ROUGH TERRAIN

There are many vehicles designed for rough terrain use. One example is the military truck-type vehicle which carries payloads comparable to over-the-road type vehicles but which must be capable of withstanding the greater variations encountered in off-the-road terrain. A critical part of the vehicle is the suspension system which must support the vehicle chassis above the vehicle axle as it traverses this rough terrain. Some of the special problems which must be dealt with are the increased axle travel which must be accommodated and which also contributes to a much greater axle stabilization problem. As the springs compress and extend in response to the terrain, they are subject to greater deformation which must be compensated for to maintain control of the vehicle and prevent breakage of the springs and wild gyrations of the chassis. Axle stabilization is an even greater problem with drive axles, as the pitch of the axle must be controlled over a much greater travel. As can be appreciated, in a drive train the pitch of the axle must remain fairly constant to maintain alignment of the drive line to prevent binding and breakage of the transmission. In the typical off-the-road vehicle, more than one axle is driven. Furthermore, the forward or steer axle is usually one of the driven axles and the suspension for it must provide clearance for the turning of the wheels, and the steering components. Thus, the suspension must be compact and yet provide open access around the axle with clearance as necessary for the relatively large axle travel without interfering with the steering components.

To solve these and other problems, applicant has succeeded in developing a suspension design in several embodiments which are uniquely adapted to rough terrain vehicles, and which can accommodate substantial loads and yet permit a relatively large axle travel with respect to the chassis. A first embodiment of this suspension includes an axle seat assembly clamped to the axle, the axle seat having provision for clamping the ends of a pair of coil type springs thereto. A pair of coil type springs are mounted to and extend between the axle seat and the chassis, with one of the coil type springs being mounted outboard of the main chassis frame member which improves the lateral stability of the axle as well as reducing the required height of the suspension as the upper mount for the spring is above the main chassis frame member. A forward hanger is rigidly secured and depends downwardly from the main chassis frame member and a pair of torque rods are pivotally connected and extend between the hanger and the axle seat. The torque rods are laterally offset which improves the lateral stability of the suspension and are also formed in a curvilinear shape to accommodate the inward extension of the wheel as it is steered. An overload bumper is secured to the chassis immediately above the axle seat and limits the upward vertical movement of the axle with respect to the chassis to prevent damage to the suspension. A torsion roll bar is mounted to each suspension on both sides of the axle, and is pivotally suspended from the chassis by short hanger bars which permits the torsion roll bar to follow the movement of the suspension as the axle deflects and yet achieve its function of stabilizing the axle should one end of the axle deflect differently than the other end of the axle.

By using coil springs, a greater amount of axle travel can be permitted and the unique parallelogram stabilization of the axle provided by the double torque rods achieves the necessary axle stabilization to accommodate this increased axle travel. The unique clamping assembly for each end of the coil springs ensures that they are held in place during vehicle operation but yet provide for rapid disassembly for repair or replacement purposes.

In a second embodiment of this suspension, a trunnion shaft is clamped to the axle seat with a spring mount welded to each end of the trunnion shaft, the trunnion shaft being rotatable with respect to the axle. The coil springs are positioned as in the first embodiment which balances them on either side of the trunnion shaft and on either side of the axle which helps to center the load directly on the trunnion shaft and axle as the trunnion shaft lies transversely to and directly above the axle. With this trunnion shaft and spring mount arrangement, as one end of the axle deflects more or less than the other end, a movement which would otherwise tend to deform the spring generally in the shape of a banana, the spring mounts and trunnion shaft are free to rotate about the axle which helps to maintain the vertical linearity of the spring and eliminate the "banana" shape. In either embodiment, a skid plate may be integrally formed with the hanger and provide a nose to deflect obstructions and prevent their entry into the suspension area which might cause damage or interfere with the vehicle's operation. Because of the unique compact design of applicant's suspension, this skid plate and hanger assembly may be placed very close to the axle itself so as not to interfere with the ability of the vehicle to attack sharp inclines of as much as 45°.

These and other advantages of applicant's suspensions are more fully described and disclosed in the drawings and preferred embodiment which follows.

BRIEF DESCRIPTION OF THE DRAWINGS

FIG. 1 is a side elevational view of the suspension embodiment with trunnion shaft and spring mount assembly;

FIG. 2 is a rear view taken along the plane of line 2—2 in FIG. 1 and detailing the torsion roll bar mounting;

FIG. 3 is a cross-sectional view of the fore spring taken along the plane of line 3—3 in FIG. 1 detailing its mounting and the torque rod mounting;

FIG. 4 is a front view taken along the plane of line 4—4 in FIG. 1 and detailing the fore mounting of the torque rods;

FIG. 5 is a top and cross-sectional view taken along the plane of line 5—5 in FIG. 1 and detailing the trunnion shaft and spring mount assembly;

FIG. 6 is a cross-sectional view taken along the plane of line 6—6 in FIG. 1 and detailing the axle seat and trunnion shaft mounting;

FIG. 7 is a partial side elevational view of the suspension of FIG. 1 as modified to accommodate the alternate hanger assembly having a skid plate;

DETAILED DESCRIPTION OF THE PREFERRED EMBODIMENT

Figure 9:
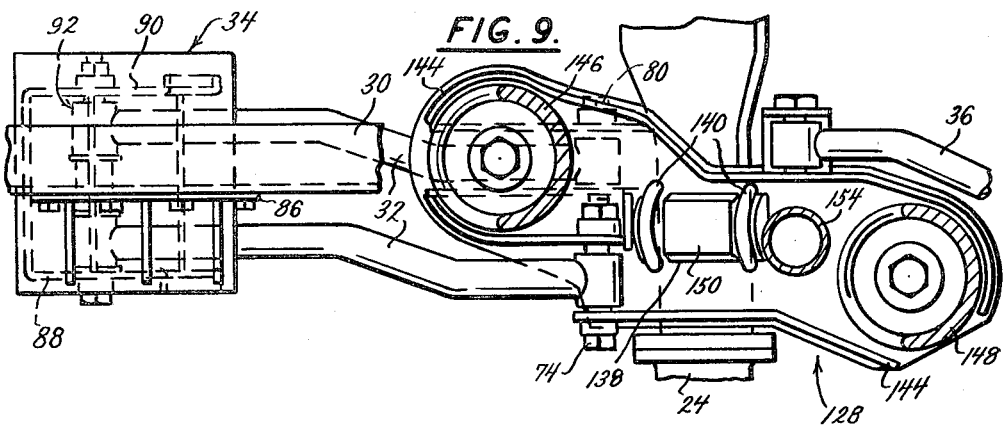
FIG. 9 is a top and partial cross-sectional view taken along the plane of line 9—9 in FIG. 8 and detailing the axle seat.

Applicant's first embodiment 20 of his suspension for rough terrain is shown in FIGS. 1-7 and generally includes an axle seat 22 bolted or clamped to an axle 24 with a trunnion shaft and spring support assembly 26 rotatably mounted to the axle seat 22. A pair of coil type springs 28 are clamped to the trunnion shaft and spring support assembly 26 and extend upwardly to the chassis 30 where they are similarly clamped. A pair of torque rods 32 are pivotally connected and extend between a hanger 34 bolted to and extending downwardly from chassis 30, and the trunnion shaft and spring support assembly 26. A torsion roll bar 36 is pivotally connected to the rear of trunnion shaft and spring assembly 26 on either side of the vehicle and is suspended from the chassis by hanger assembly 38. One or more shock absorbers 40 are bolted to and extend between the chassis 30 and trunnion shaft and spring support assembly 26. Thus, applicant's first embodiment 20 provides parallelogram control in a coil spring type suspension with a trunnion shaft spring mount to maintain the vertical linearity of the springs 28 as the axle 24 deflects with respect to the chassis 30. The torsion roll bar 36 is similarly pivotally mounted to follow the movement of the axle 24 and suspension 20 without loss of function. Having generally described the major components and subassemblies of the first embodiment 20, applicant will now proceed with a more detailed description of the various parts thereof.

As shown more particularly in FIG. 6, axle seat 22 includes a bottom bracket 42 having gussets 44 to strengthen it and an upper bracket 46, brackets 42, 46 being clamped together by U-bolts 48. Upper bracket 46 has shoulders 50 (see FIG. 1) around which U-bolts 48 fit in a partially recessed manner. A bearing sleeve 52 surrounds a trunnion shaft 54 rotatably mounted to upper bracket 46, trunnion shaft 54 being transverse to axle 24. Thus, trunnion shaft 54 is free to rotate within bearing sleeve 52 and upper bracket 46 in response to changes in loading or angular orientation of axle 24 with respect to chassis 30, as explained in more detail hereinafter.

As best shown in FIG. 5, a forward spring support assembly 56 and a rearward spring support assembly 58 are secured to the ends of trunnion shaft 54 and are free to pivot as trunnion shaft 54 rotates. As shown in FIG. 3, the fore spring support assembly 56 includes a generally circular clamp plate 60 with an upturned periphery 62 to clamp the fore coil type spring 64 thereto with bolt assembly 66. The fore spring support assembly 56 also includes a generally peripheral upturned side plate 68 which partially surrounds the lower end of fore coil spring 64 to form a pocket therefor and maintain it in place during operation. A pair of downwardly depending bracket members 70 provide a mounting position for the pivotal mounting of the lower torque rod 72 with bolt assembly 74. Similarly, an outboard bracket member 76 provides a convenient mounting for the aft end of upper torque rod 78 by bolt assembly 80. Thus, the aft end of each torque rod 72, 78 is pivotally connected to the fore spring support assembly 56.

As shown in FIGS. 1 and 4, a hanger assembly 82 is bolted to the chassis 30 by bolts 84 and extends downwardly therefrom. Hanger assembly 82 includes a center vertical bracket 86 with an outboard angle bracket 88 and an inboard bracket 90 welded thereto and providing the mounting means for the universal joints 92, 94 at the fore end of torque rods 72, 78, respectively. Universal joints 92, 94 may be of a type disclosed and described in application Ser. No. 341,474, filed Jan. 21, 1982, also an invention of applicant and the disclosure of which is incorporated herein by reference.

The upper end of the forward coil spring 64 is coiled with an ever decreasing radius to form a generally flattened surface to facilitate its mounting. As best shown in FIG. 3, the upper end of coil spring 64 fits within a circular bracket 96 and is secured to chassis 30 with a bolt and washer assembly 98. As best shown in FIGS. 1 and 2, the upper end of rear coil spring 100 is secured in the same manner by bolt and washer assembly 102, except that an outboard bracket assembly 104 permits mounting of the spring above the main chassis frame member 30 and outboard therefrom.

The rear spring support assembly 58, as best shown in FIGS. 1, 2 and 5, includes an inboard bracket extension 106 which provides the pivotal mounting point for torsion roll bar 36 by bolt assembly 108. The torsion roll bar 36 is further stabilized by one or more hanger assemblies 38 which are bolted by bolts 112 to the main frame members 30. Each hanger assembly 38 includes a pair of downwardly extending bracket members 114 between which is mounted the upper end of hanger arm 116 by bolt assembly 118. The lower end of hanger arm 116 includes a clamp and bushing assembly 120 secured by bolts 122 to a medial portion of torsion roll bar 36. Thus, hanger assemblies 38 permit limited deflection of torsion roll bar 36 to follow the movement of axle 24 and yet retain its desired function of resisting torsion and roll between the axle 24 and chassis 30.

As best shown in FIG. 7, a skid plate 124 may be formed at the fore of hanger 34. With this feature, the upper and lower torque rods 130, 132 have an upward bend and the universal joints 134, 136 are inverted which add to the compactness of the second embodiment 124 to permit a greater angle "a" of attack and hence angle of skid plate 124.

Figure 8:
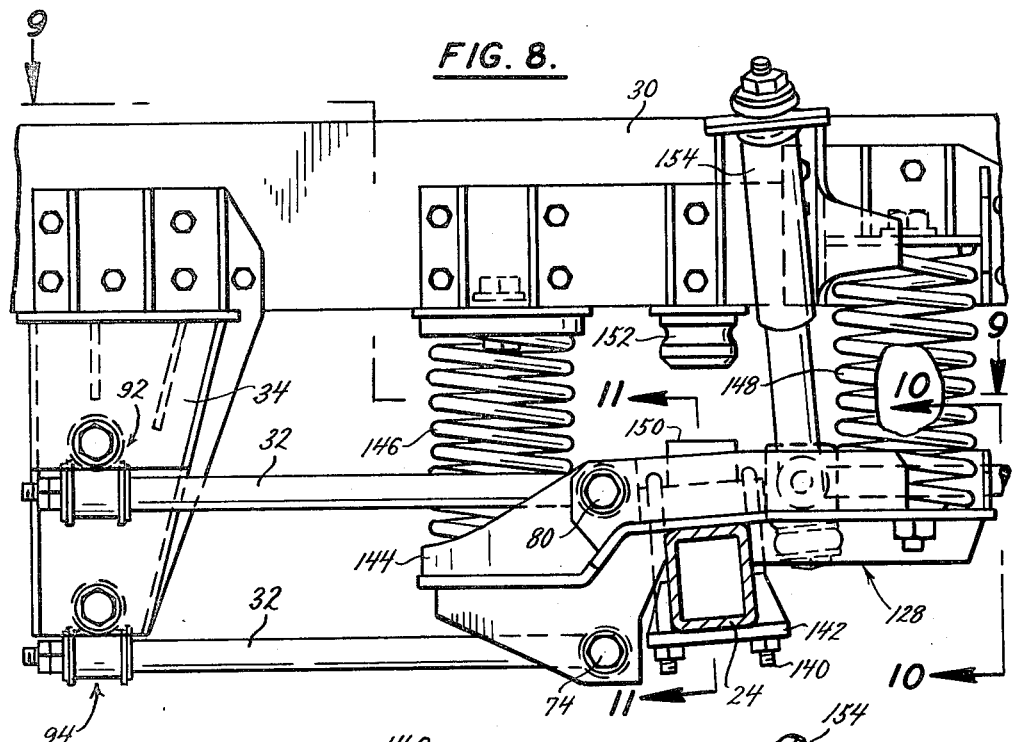
FIG. 8 is a partial side elevational view of the second embodiment of applicant's suspension with fixed axle seat and spring mount.
Figure 11:
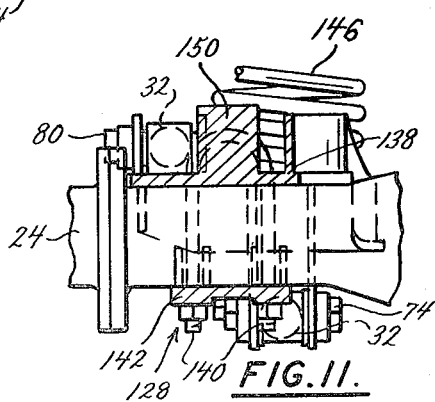
FIG. 11 is a cross-sectional view taken along the plane of line 11—11 in FIG. 8 and detailing the axle seat mounting.
Figure 10:
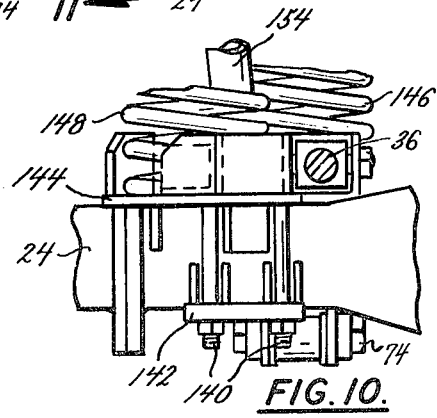
FIG. 10 is a rear view detailing the rear spring mount and axle seat.

As best shown in FIGS. 8-11, virtually the same suspension as is shown in applicant's first embodiment 20 may be provided with a fixed angle seat and spring support assembly 128. An upper bracket assembly 138 is bolted to axle 24 by U-bolts 140, with lower bracket 142 "seating" the axle 24 therebetween. The upper bracket assembly 138 includes a main spring support bracket 144 extending the length of the assembly to provide mounting for both fore and aft coil springs 146, 148 as in the first embodiment 20. A center overload platform 150 matches and lines up with an overload bumper 152 affixed to chassis member 30 to restrict the upward movement of axle 24 with respect thereto to prevent damage to the suspension. Of course, one or more shock absorbers 154 may be mounted to and extend between the chassis 30 and the axle seat and spring support assembly 128.

OPERATION

Applicant's suspension systems are designed to provide a safe reliable ride over particularly rough terrain, such as that encountered in off-the-road travel by a military vehicle. The parallelogram stabilization provided by the torque rods extending between a chassis member and the axle seat stabilize the axle to maintain its pitch as it moves with respect to the chassis. The coil springs are generally balanced across the axle and, in the embodiment utilizing a trunnion shaft, are balanced across the trunnion shaft to center the load on the axle as the axle moves vertically. For those vehicles expected to encounter particularly rough terrain, the trunnion shaft embodiment permits the spring support brackets to pivot or rotate with respect to the axle to maintain the vertical linearity of the springs as one wheel or the other, but not both, moves vertically with respect to the chassis and therefore moves in a somewhat arcuate manner and not directly vertically. This could be caused by one wheel or the other going over a pothole or log. This motion would otherwise tend to deform the spring into a "banana" shape which causes instability and increased stress leading to early failure or damage to the suspension. However, with applicant's second embodiment not having the trunnion shaft, the suspension is perfectly adequate for most rough terrain. The trunnion shaft merely provides increased ability to handle extreme terrain.

The torsion roll bar is pivotally connected to each suspension on opposite sides of the vehicle and is suspended by one or more hanger arm assemblies from the main frame of the chassis. This permits limited deflection of the torsion roll bar as the axle moves through the pivoting movement of the hanger arm assembly and the pivotal connection at each suspension. The torsion roll bar remains fully operative as the axle moves without limiting axle movement or interfering with suspension operation. Another feature of applicant's suspensions is the skid plate which can be formed at the nose or forward end of the hanger assembly and which blocks the entry of obstructions into the suspension area of the vehicle and yet permits a desirable 45° angle of attack for the vehicle wheel against the terrain. The compactness of applicant's suspensions permits this angle of attack and yet includes the parallelogram axle control through the pair of torque rods pivotally attached to and extending between the hanger assembly and the axle seat. An overload bumper may be secured to the frame and a bumper platform secured to the top of the axle seat for contact with the overload bumper to limit vertical axle movement to prevent excessive compaction of the coil springs and possible damage thereto. To further enhance the compactness of the suspension, the rear coil spring mount is achieved by an outboard bracket member extending above the level of the main chassis frame. Of course, one or more shock absorbers may be conveniently mounted and extend between the chassis and the axle seat or spring support assembly, as appropriate.

Various changes and modifications to the invention would be apparent to one of ordinary skill in the art upon a reading of applicant's disclosure. These changes and modifications are included within the teaching of applicant's invention which is limited only by the scope of the claims appended hereto.

I claim:

1. A suspension assembly for supporting a truck type vehicle chassis from at least one axle comprising an axle seat secured to said axle, a trunnion shaft and spring mount assembly rotatably mounted to said axle seat, a spring means extending between the said trunnion shaft and spring mount assembly and the chassis, and at least one torque rod pivotally connected to and extending between the trunnion shaft and spring mount assembly and the chassis, said trunnion shaft being aligned transverse to the axle to maintain substantial vertical linearity of said spring means as the axle moves with respect to the chassis.

2. The suspension assembly of claim 1 wherein the spring means includes two springs, said springs being substantially equally spaced about the trunnion shaft and the axle.

3. The suspension assembly of claim 2 further comprising a hanger assembly rigidly secured to and extending downwardly from the chassis and wherein at least two torque rods are pivotally connected to and extend between the trunnion shaft and spring mount assembly and said hanger assembly, said torque rods being of substantially the same length to form a parallelogram and control the axle as it oscillates with respect to the chassis.

4. The suspension assembly of claim 3 wherein the springs are coil type springs.

5. The suspension assembly of claim 4 further comprising a second suspension on the opposite side of the vehicle, and a torsion-roll bar connected to and extending between both said suspensions and the chassis.

6. The suspension assembly of claim 3 wherein said torque rods are laterally offset from each other to improve the lateral stability of the suspension.

7. The suspension assembly of claim 3 further comprising a skid plate integrally formed to the hanger, said skid plate adapted to engage obstructions and prevent their causing damage to the suspension or interference with vehicle operation.

8. The suspension assembly of claim 3 further comprising a shock absorber extending between said suspension and the chassis.

9. A suspension assembly for supporting a truck type vehicle chassis having a main chassis frame from at least one axle comprising an axle seat secured to said axle, a trunnion shaft and spring mount assembly rotatably mounted to the axle seat, the trunnion shaft being aligned transversely to the axle, the spring mount assembly having means to mount a pair of coil type springs, said springs being substantially equally spaced about the axle and about the trunnion shaft and extending between the spring mount assembly and the chassis, one of said springs being outboard of the main chassis frame, and a pair of torque rods pivotally connected to and extending between the chassis and the spring mount, said torque rods being of substantially the same length to form a parallelogram.

10. The suspension assembly of claim 9 further comprising a shock absorber extending between the chassis and the spring mount, and wherein the torque rods are laterally offset to improve the lateral stability of the suspension.

11. The suspension assembly of claim 10 further comprising a second suspension assembly mounted on the opposite side of the vehicle to support that side of the chassis from that end of the axle, and a torsion roll bar mounted to and extending between both said suspension assemblies and the chassis.

12. The suspension assembly of claim 10 further comprising an overload bumper mounted atop the axle seat to limit upward travel of the suspension assembly with respect to the chassis.

13. The suspension assembly of claim 10 further comprising a hanger assembly rigidly secured to and extending downwardly from the chassis, the fore end of the torque rods being connected to said hanger, and a skid plate integrally formed to the fore portion of the hanger to engage obstructions and prevent their causing damage to the suspension or interference with vehicle operation.

14. A suspension assembly for supporting a truck type vehicle chassis from at least one axle comprising an axle seat rigidly secured to the axle, said axle seat having means to mount at least one spring, two coil type springs extending between the chassis and the axle seat, said coil springs being equally spaced about the axle, and a pair of torque rods pivotally mounted to and extending between the chassis and the axle seat, said torque rods being substantially the same length and laterally offset from each other to form a parallelogram to control axle movement and to provide increased lateral stability.

15. The suspension assembly of claim 14 further comprising a hanger rigidly connected to and extending downwardly from the chassis, the fore end of each torque rod being pivotally connected to the hanger.

16. The suspension assembly of claim 15 further comprising a universal joint connecting the fore end of each torque rod to the hanger.

17. The suspension assembly of claim 16 further comprising a shock absorber extending between the chassis and the axle seat, and an overload bumper mounted to the chassis to limit vertical movement of the suspension with respect to the chassis.

18. The suspension assembly of claim 14 further comprising a second suspension assembly supporting the opposite side of the vehicle chassis from the axle, and a torsion roll bar connected to and extending between both said suspensions and the chassis.

19. The suspension assembly of claim 14 wherein one coil spring is inboard and on the opposite side of the axle from the other coil spring.

* * * * *